(12) United States Patent
Zahi et al.

(10) Patent No.: US 11,125,551 B2
(45) Date of Patent: Sep. 21, 2021

(54) LIGHT MODULATION FOR INSPECTION PROBES

(71) Applicant: General Electric Company, Schenectady, NY (US)

(72) Inventors: Zirong Zahi, Skaneateles, NY (US); Kevin George Harding, Niskayuna, NY (US); Jie Han, Shanghai (CN); Dongmin Yang, Skaneateles, NY (US); Clark Alexander Bendall, Skaneateles, NY (US); Jijun Gu, Shanghai (CN)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 150 days.

(21) Appl. No.: 15/674,920

(22) Filed: Aug. 11, 2017

(65) Prior Publication Data
US 2018/0045510 A1    Feb. 15, 2018

(30) Foreign Application Priority Data

Aug. 12, 2016    (CN) .......................... 201610666159.6

(51) Int. Cl.
| | | |
|---|---|---|
| *G01B 11/25* | (2006.01) | |
| *G01N 21/954* | (2006.01) | |
| *G02B 23/24* | (2006.01) | |
| *G01N 21/88* | (2006.01) | |

(52) U.S. Cl.
CPC .......... *G01B 11/2518* (2013.01); *G01B 11/25* (2013.01); *G01N 21/8806* (2013.01); *G01N 21/954* (2013.01); *G02B 23/2415* (2013.01); *G01N 2021/8829* (2013.01)

(58) Field of Classification Search
None
See application file for complete search history.

(56) References Cited

U.S. PATENT DOCUMENTS

| | | | | |
|---|---|---|---|---|
| 2002/0057438 | A1* | 5/2002 | Decker | G01B 11/2509 356/601 |
| 2003/0112447 | A1* | 6/2003 | Harding | G01B 11/25 356/603 |
| 2009/0059231 | A1* | 3/2009 | Fukazawa | G01B 11/25 356/369 |
| 2009/0225320 | A1* | 9/2009 | Bendall | G01B 11/25 356/447 |
| 2009/0225329 | A1* | 9/2009 | Bendall | G01B 11/25 356/610 |

(Continued)

*Primary Examiner* — Mohammed Jebari
(74) *Attorney, Agent, or Firm* — Mintz Levin Cohn Ferris Glovsky and Popeo, P.C.

(57) ABSTRACT

A probe system and a method are provided. The probe system includes an emitter unit, a pattern generation system, and an intensity modulator. The emitter unit is for emitting light. The pattern generation system is for projecting at least one reference structured-light pattern onto an object surface to obtain at least one reference projected pattern, and including a mirror scanning unit for reflecting the light to a plurality of directions. The intensity modulator is for modulating intensity of the light according to the at least one reference projected pattern to provide modulated light to the mirror scanning unit to reflect the modulated light to the plurality of directions to project at least one modulated structured-light pattern onto the object surface to obtain at least one modulated projected pattern.

13 Claims, 4 Drawing Sheets

(56) References Cited

U.S. PATENT DOCUMENTS

| | | | |
|---|---|---|---|
| 2009/0225333 A1* | 9/2009 | Bendall | G01N 21/954 356/626 |
| 2010/0149551 A1* | 6/2010 | Malinkevich | G01B 11/25 356/603 |
| 2013/0229666 A1* | 9/2013 | Suzuki | G01B 11/026 356/610 |
| 2015/0292874 A1* | 10/2015 | Shpunt | G01B 11/2518 345/420 |
| 2017/0172392 A1* | 6/2017 | Ito | A61B 1/00 |
| 2017/0199028 A1* | 7/2017 | Tin | G01B 11/22 |

\* cited by examiner

LIGHT MODULATION FOR INSPECTION PROBES

CROSS-REFERENCE TO RELATED APPLICATIONS

The present application claims priority to Chinese Application No. 201610666159.6, filed Aug. 12, 2016, and entitled "Probe System and Method," which is hereby incorporated by reference in its entirety.

BACKGROUND

Embodiments of the invention relate to probe systems, and more particularly, to probe systems and methods for three-dimensional (3D) surface mapping and dimensional measurement.

Borescopes and endoscopes (borescopes/endoscopes) are types of a probe and typically used for inspection inside a remote cavity. Most borescopes/endoscopes project structured light onto an object surface to make 3D surface mapping and dimensional measurement. However, when the object surface is shiny, the intensity of the reflected light from the object surface is too high to be accommodated by image sensors, and when the object surface is very dark, the intensity of the reflected light is too low to be accommodated by the image sensors. The object surface may have a shiny part and/or a dark part so the object surface has reflection variations which make generation of a complete image of the object surface is difficult. The shiny part of the object surface is imaged as a specular highlight area, and the dark part of the object surface is imaged as a very dark area, so information of the shiny part and the dark part of the object surface cannot be obtained. Thereby, measuring objects with surface reflectivity variations is challenging for any probe system or method.

It is desirable to provide probe systems and methods to address the above-mentioned problem.

BRIEF DESCRIPTION

In accordance with one embodiment disclosed herein, a probe system is provided. The probe system includes an emitter unit, a pattern generation unit, and an intensity modulator. The emitter unit is for emitting light. The pattern generation unit is for projecting at least one reference structured-light pattern onto an object surface to obtain at least one reference projected pattern, and includes a mirror scanning unit for reflecting the light to a plurality of directions. The intensity modulator is for modulating intensity of the light according to the at least one reference projected pattern to provide modulated light to the mirror scanning unit to reflect the modulated light to the plurality of directions to project at least one modulated structured-light pattern onto the object surface to obtain at least one modulated projected pattern.

In accordance with another embodiment disclosed herein, a method is provided. The method includes emitting light; reflecting the light in a plurality of directions to project at least one reference structured-light pattern onto an object surface to obtain at least one reference projected pattern; modulating intensity of the light according to the at least one reference projected pattern to obtain the modulated light; reflecting the modulated light in the plurality of directions to project at least one modulated structured-light pattern onto the object surface to obtain at least one modulated projected pattern.

DRAWINGS

These and other features and aspects of the present disclosure will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art to which this disclosure belongs. The terms "a" and "an" do not denote a limitation of quantity, but rather denote the presence of at least one of the referenced items. The use of "including," "comprising" or "having" and variations thereof herein are meant to encompass the items listed thereafter and equivalents thereof as well as additional items. Moreover, the terms "coupled" and "connected" are not intended to distinguish between a direct or indirect coupling/connection between two components. Rather, such components may be directly or indirectly coupled/connected unless otherwise indicated.

Figure 1:
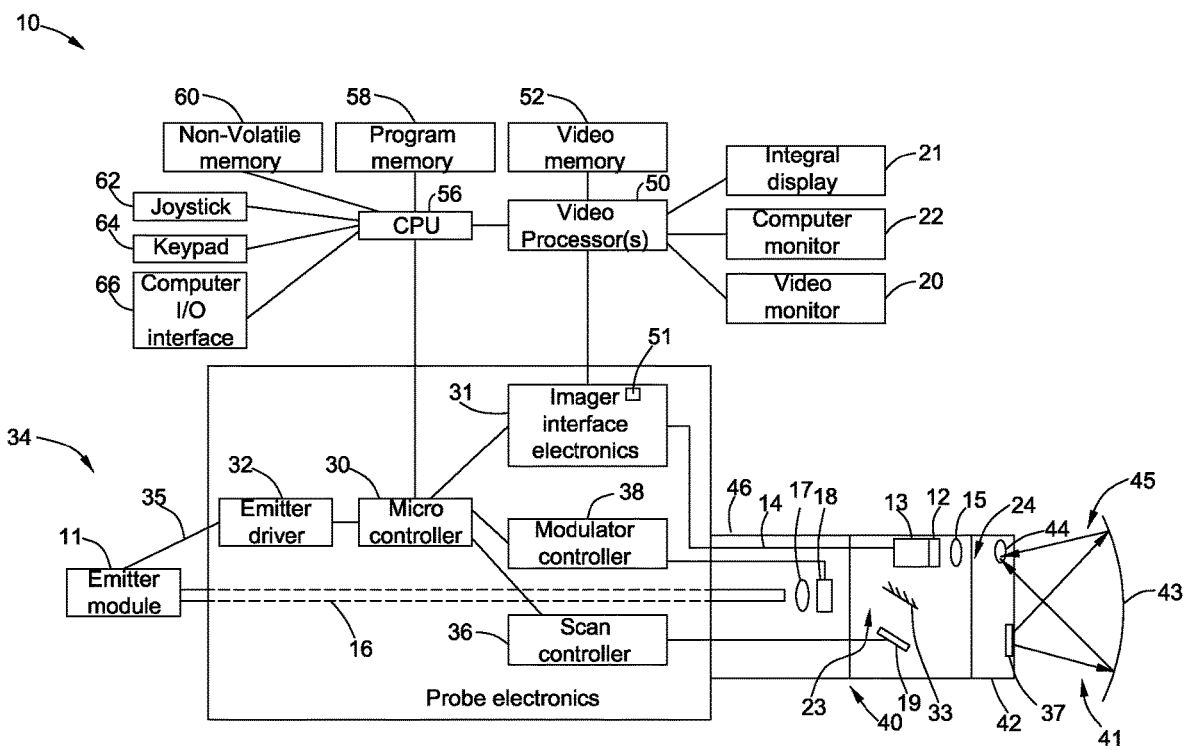
FIG. 1 is a schematic diagram of a probe system in accordance with an embodiment.

FIG. 1 illustrates a schematic diagram of a borescope/endoscope system or probe system 10 in accordance with an embodiment. The probe system 10 includes an emitter unit 34 for emitting light and including an emitter module 11. In an embodiment, the emitter module 11 includes one or more point light emitters for emitting one or more light points. The point light emitter may be a laser diode, a light-emitting diode (LED), or any other emitter capable of emitting the light point. In another embodiment, the emitter module 11 includes a line light emitter for emitting a light line. The line light emitter may be an array of point light emitters, such as an array of laser diodes or LEDs, or any other light source capable of emitting the light line. In still another embodiment, the emitter module 11 may include an emitter, which may be the point light emitter, and an array of fibers coupled with the emitter for generating the light line. In still another embodiment, the emitter module 11 may include an array of point light emitters arranged to emit a light spot which is bigger than the light point.

The emitter unit 34 includes a drive conductor 35 and an emitter drive 32. In an embodiment, the drive conductor 35, which may include one or more wires, carries power from the emitter drive 32 to the emitter module 11. In an embodiment, the emitter unit 34 may include a microcontroller 30 communicates with a central processing unit (CPU) 56 and controls the emitter driver 32 to drive the emitter module 11. The microcontroller 30 may command the emitter driver 32 to supply power to the emitter module 11 to emit the light, or disable the emitter driver 32 to turn off the emitter module 11. In an embodiment, the emitter driver 32 and/or the microcontroller 30 may be integrated in the emitter module 11. In the illustrated embodiment, the microcontroller 30 performs other functions other than controlling the emitter driver 32, which will be described in subsequent paragraphs. The light from the emitter module 11 may be guided by an optical fiber line 16 to a pattern generation unit 23. The optical fiber line 16 may include one or more fibers.

The pattern generation unit 23 is for projecting at least one structured-light pattern 41 onto an object surface 43 to obtain at least one projected pattern 45. The pattern generation unit 23 is configured to form the structured-light pattern 41 using the light from the emitter module 11. In an embodiment, the structured-light pattern 41 includes parallel light and dark lines including sinusoidal intensity profiles. Line patterns having square, trapezoidal, triangular, or other profiles may be projected on the object surface 43 as well. The structured-light pattern 41 may also include other than straight, parallel lines. For example, curved lines, wavy lines, zigzagging lines, or other such patterns may be used with appropriate analysis. The object surface 43 reflects the structured-light pattern 41 projected thereon to obtain the projected pattern 45.

In an embodiment, at least three structured-light patterns offset from each other are formed and projected on the object surface in sequence. The at least three structured-light patterns may be ⅓ period offset from each other along the axis perpendicular to the lines of the structured-light pattern resulting in a 120° phase shift between projected patterns. It is noted that it is a non-limited example. In some other embodiments, some other phase-shift structured-light patterns may be formed and utilized.

The pattern generation unit 23 includes a mirror scanning unit 19 for reflecting the light to multiple directions. The mirror scanning unit 19 may include one or more controllable mirrors controlled to tilt to reflect the light. In an embodiment, the controllable mirror is controlled to tilt in two-dimensional direction to reflect a single light point to various expected directions. The controllable mirror may be controlled to tilt in two perpendicular directions. In another embodiment, the controllable mirror is controlled to tilt in one-dimensional direction to reflect the light to various expected directions. In another embodiment, multiple controllable mirrors are controlled to tilt in one-dimensional or two-dimensional direction to respectively reflect corresponding light points. In an embodiment, the mirror scanning unit 19 includes one or more micro electro mechanical systems (MEMS) mirror scanners.

A scan controller 36 is configured to control the controllable mirror of the mirror scanning unit 19 to tilt according to expected structured-light patterns. The microcontroller 30 may send signals of directions and/or angles to which the controllable mirror tilts to the scan controller 36, and the scan controller 36 tilts the controllable mirror according to the signals. In an embodiment, the signals may indicate positions of edges of the controllable mirror so as to change the directions and angles thereof. The controllable mirror may be tilted to various directions and/or angles to direct the light to the various directions. The scan controller 36 may also provide power to the mirror scanning unit 19 in an embodiment.

The pattern generation unit 23 includes an intensity modulator 18 for modulating intensity of the light from the emitter module 11. In an embodiment, the intensity modulator 18 is positioned in optic communications, such as positioned downstream the optical fiber line 16, for external light modulation. The intensity modulator 18 may be a liquid crystal panel or a micro-mirror array, for example. In another embodiment, the intensity modulator 18 modulates the current driving the emitter module 11 to adjust the intensity of the light, which may be positioned within the emitter modu-late 11 or the emitter driver 32. A modulator controller 38 is configured to control the intensity modulator 18 to modulate the light.

The mirror scanning unit 19 reflects the light from the emitter unit 34 without modulation, and the pattern generation unit 23 generates and projects at least one reference structured-light pattern onto the object surface 43 to obtain at least one reference projected pattern. The reference projected pattern may include light with intensity variations due to the reflection variations of the object surface 43.

The intensity modulator 18 modulates the intensity of the light from the emitter unit 34 according to the reference projected pattern to obtain modulated light. If the intensity of the reflected light of the reference projected pattern is too high that indicates a corresponding part of the object surface 43 is shiny, the intensity modulator 18 decreases the intensity of the light projected to the shiny part of the object surface 43. If the intensity of the reflected light of the reference projected pattern is too low that indicates a corresponding part of the object surface 43 is too dark, the intensity modulator 18 increases the intensity of the light projected to the dark part of the object surface 43. If the intensity of the reflected light of the reference projected pattern is accommodated by image sensors (not shown), the intensity of the light projected to the part of the object surface 43 is not modulated.

The intensity modulator 18 provides the modulated light to the pattern generation unit 23 to project at least one modulated structured-light pattern onto the object surface 43 to obtain at least one modulated projected pattern. The intensity modulator 18 modulates the light per point, per line, or per area during the mirror scanning unit 19 reflecting the modulated light. The light modulation may be performed multiple times until obtaining an expected modulated projected pattern suitable to generate a clear and complete image. Accordingly, the reflection variations are compensated and the projected pattern distribution is adjusted to accommodate the reflection variations.

In the illustrated embodiment, the pattern generation unit 23 includes a lens 17 is positioned downstream the fiber line 16 for scattering the light and the scattered light from the lens 17 is utilized to form the structured-light pattern. A mirror 33 is arranged to direct the light from the emitter module 11 to the mirror scanning unit 19 to make the light to be reflected by the mirror scanning unit 19. In an embodiment, a grating 37 is positioned downstream the mirror scanning unit 19 for shadowing the light from the mirror scanning unit 19.

The emitter module 11, the optical fiber line 16, the lens 17, the intensity modulator 18, the mirror 33, the mirror scanning unit 19 and the grating 37 may be arranged in a manner shown in FIG. 1, but it is not limited. In another embodiment, the emitter module 11, the optical fiber line 16, the lens 17, the intensity modulator 18, the mirror 33, the mirror scanning unit 19 and the grating 37 may be arranged in any other optical manner to form and project the structured-light pattern to the object surface 43. In some embodiments, the lens 17, the mirror 33 and/or the grating 37 may be omitted, or some other optics may be utilized.

In the illustrated embodiment, the lens 17, the intensity modulator 18, the mirror 33, the mirror scanning unit 19 and the grating 37 are positioned in an insertion tube 40, the emitter module 11 is positioned outside of the insertion tube 40, and the optical fiber line 16 extends from the emitter module 11 to the insertion tube 40. The insertion tube 40 includes an imaging unit 24 which includes viewing optics 44, at least an imager 12, a buffer electronics 13 and probe optics 15, and is for obtaining image data from the at least one projected pattern 45. The insertion tube 40 may be positioned close to the object surface 43, for example, inserted into the object. The insertion tube 40 includes an elongated portion 46 and a detachable distal tip 42. The elongated portion 46 may be flexible and include the imager 12, the buffer electronics 13, and the probe optics 15. The detachable distal tip 42 typically attaches to the elongated portion 46. The detachable distal tip 42 includes the viewing optics 44 which are used in combination with the probe optics 15 to guide and focus light of the projected pattern 45 received from the object surface 43 onto the imager 12. The elements shown in the distal tip 42 could alternatively be located on the elongated portion 46. These elements include the viewing optics 44 and the grating 37.

In an embodiment, the structured-light pattern 41 is projected from the front end of the insertion tube 40 to the object surface 43 and the projected pattern 45 from the object surface 43 is transmitted back from the front end of the insertion tube 40 to the viewing optics 44. In another embodiment, the structured-light pattern 41 may be projected out from a side of the insertion tube 40 to the object surface 43 and the projected pattern 45 from the object surface 43 is transmitted back from the side of the insertion tube 40 to the viewing optics 44.

The imager 12 includes the imager sensors. The imager 12 may include, for example, a two-dimensional array of light-sensitive pixels that outputs image data in response to the light level sensed at each pixel. The imager 12 may include a charge-coupled device (CCD), a complementary metal-oxide-semiconductor (CMOS) image sensor, or other devices of similar function. The image data from the imager 12 is buffered by the buffer electronics 13 and transferred to an imager interface electronics 31 via a signal line 14. The imager interface electronics 31 may include, for example, power supplies, a timing generator for generating imager clock signals, an analog front end for digitizing the image data, and a digital signal processor (DSP) 51 for processing the digitized image data into a more useful format for a video processor 50.

The microcontroller 30 may receive the image data which may be the digitized image data from the imager interface electronics 31 and analyze the image data to determine modulation of the light. In an embodiment, the microcontroller 30 analyzes gray levels of the image data to determine if the gray levels are suitable for generating a clear image, for example, determine if the gray levels each are between a higher threshold and a lower threshold. If the part of the object surface 43 is shiny, the gray levels of the image data corresponding to the shiny part are higher than the higher threshold, and the image of the shiny part will be highlight. If the part of the object surface 43 is too dark, the gray levels of the image data corresponding to the dark part are lower than the lower threshold, and the image of the dark part will be too dark. In an embodiment, the higher threshold may be in a range of 220 to 250, and the lower threshold may be in a range of 0 to 60. The higher threshold may be 230 and the lower threshold may be 50 in a non-limited example.

If the gray level of one or more image data is higher than the higher threshold, the microcontroller 30 commands the modulator controller 38 to control the intensity modulator 18 to reduce the intensity of the light from the emitter module 11. If the gray level of one or more image data is lower than the lower threshold, the microcontroller 30 commands the modulator controller 38 to control the intensity modulator 18 to increase the intensity of the light from the emitter module 11. If the gray level of one or more image data is between the higher threshold and the lower threshold, the microcontroller 30 commands the modulator controller 38 to control the intensity module 18 not to adjust the intensity of the light. The intensity of the light is modulated until the gray level of the image data is between the higher threshold and the lower threshold. The imaging unit 24 obtains modulated image data from the at least one modulated projected pattern. The modulated image data may be utilized for 3D mapping and measurement of the object surface 43 in an embodiment. Thereby, the image of the object surface 43 is clear at every parts, so that 3D dimensional information of the object surface 43 can be obtained.

The video processor 50 performs various functions not limited to image capture, image enhancement, graphical overly merging, and video format conversion and stores information relating to those functions in a video memory 52. The video processor 50 may include a field-programmable gate array (FPGA), a camera DSP, or other processing elements, and provide information to and receives information from CPU 56. The provided and received information may relate to commands, status information, video, still images, and/or graphical overlays. The video processor 50 also outputs signals to various monitors such as a computer monitor 22, a video monitor 20, and an integral display 21.

When connected, each of the computer monitor 22, the video monitor 20, and/or the integral display 21 typically display images of the object surface 43 under inspection, menus, cursors, and measurement results. The computer monitor 22 is typically an external computer type monitor. Similarly, the video monitor 20 typically includes an external video monitor. The integral display 21 is integrated and built into the probe system 10 and typically includes a liquid crystal display (LCD).

The CPU 56 preferably uses both a program memory 58 and a non-volatile memory 60, which may include removable storage devices. The CPU 56 may also use a volatile memory such as RAM for program execution and temporary storage. A keypad 64 and a joystick 62 convey a user input to the CPU 56 for such functions as menu selection, cursor movement, slider adjustment, and articulation control. A computer I/O interface 66 provides various computer interfaces to CPU 56 such as USB, Firewire, Ethernet, audio I/O, and wireless transceivers. Additional user I/O devices such as keyboard or mouse may be connected to the computer I/O interface 66 to provide user control. The CPU 56 generates graphical overlay data for display, provides recall functions and system control, and measurement processing, and provides image, video, and audio storage.

The CPU 56 and the previously discussed video processor 50 may be combined into one element of the probe system 10. In addition, components of the probe system 10 including, but not limited to, the CPU 56 and the video processor 50 may be integrated and built into the probe system 10 or, alternatively, be externally located. The components of the probe system 10 are not limited to the components shown in FIG. 1. In an embodiment, one or more components of the probe system 10 shown in FIG. 1 may be omitted. For example, the joystick 62, the keypad 64 or the computer I/O interface 66 may be omitted, or the integral display 21, the computer monitor 22 or the video monitor 20 may be omitted in some embodiments.

Figure 2:
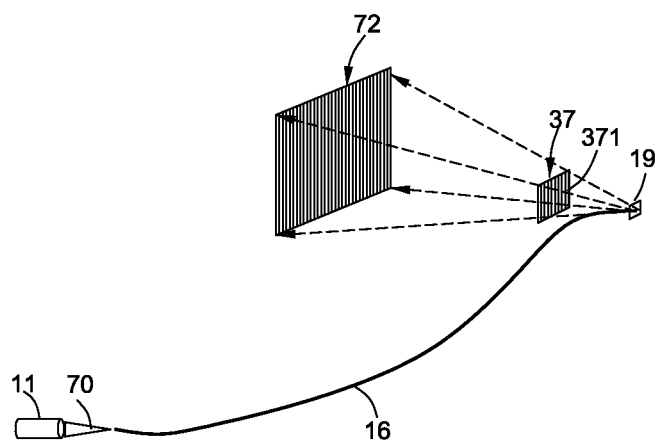
FIG. 2 is a light path diagram of structured-light pattern generation in accordance with an embodiment.

FIG. 2 illustrates a light path diagram of structured-light pattern generation in accordance with an embodiment. In the illustrated embodiment, a single emitter of the emitter module 11 emits light 70. In the embodiment, the single emitter emits a light point. The light 70 is transmitted by the optical fiber line 16 to the mirror scanning unit 19. In an embodiment, the optical fiber line 16 is a single fiber to output the light point. In an embodiment, the controllable mirror of the mirror scanning unit 19 is tilted in one-dimensional direction to reflect the light point to multiple directions to project a light line. The light line may be parallel to or perpendicular to the grating pattern 371 of the grating 37 which is a line grating in the illustrated embodiment. The light line is projected to the grating 37 and shadowed by the grating 37 to form the structured-light pattern 72 which is a line pattern in the illustrated embodiment. In an embodiment, the mirror scanning unit 19 may project one or more phase-shift light lines to form one or more phase-shift structured-light patterns through the grating 37. The structured pattern and the one or more phase-shift structured-light patterns are utilized to generate an image of the object surface.

In this embodiment, the intensity of the light line is adjusted point to point. Each point of the light line is shadowed by the grating 37 to scan a small area of the object surface, so the intensity of the light point emitted by the emitter 11 is modulated according to the reflected light from the corresponding scanned small area of the object surface.

In another embodiment, the light point is emitted and the controllable mirror of the mirror scanning unit 19 is tilted in two-dimensional direction to reflect the light point to project a light area. The light area is projected to the grating 37 and shadowed by the grating 37 to form the structured-light pattern 72. The mirror scanning unit 19 may project one or more phase-shift light areas to form one or more phase-shift structured-light patterns. In this embodiment, the intensity of the light area is adjusted point to point.

In still another embodiment, the optical fiber line 16 includes an array of fibers to receive the light point and output a light line, and the controllable mirror of the mirror scanning unit 19 is tilted in one-dimensional direction to reflect the light line to project the light area. The light area is shadowed by the grating 37 to form the structured-light pattern 72. In this embodiment, the intensity of the light area is modulated line to line. The intensity of the light point from the emitter 11 is modulated to modulate the intensity of the light line.

Figure 3:
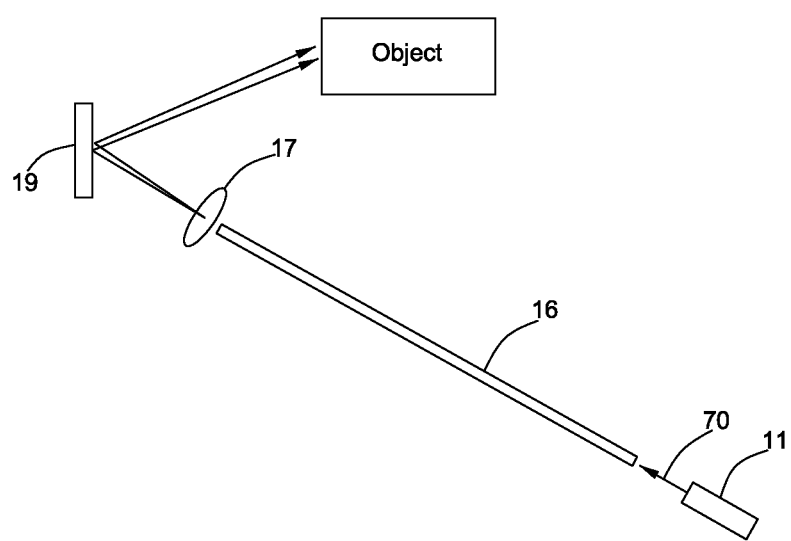
FIG. 3 is a light path diagram of structured-light pattern generation in accordance with another embodiment.

FIG. 3 illustrates a light path diagram of structured-light pattern generation in accordance with another embodiment. The light point 70 from the emitter module 11 is transmitted by the optical fiber line 16 to the lens 17 which is a divergence lens. The lens 17 diverges and directs the light point to the mirror scanning unit 19, and the controllable mirror of the mirror scanning unit 19 is tilted in one-dimensional direction to form a light line of the structured-light pattern. The structured-light pattern is created line to line by titling the mirror scanning unit 19 in two-dimensional direction.

Figure 4:
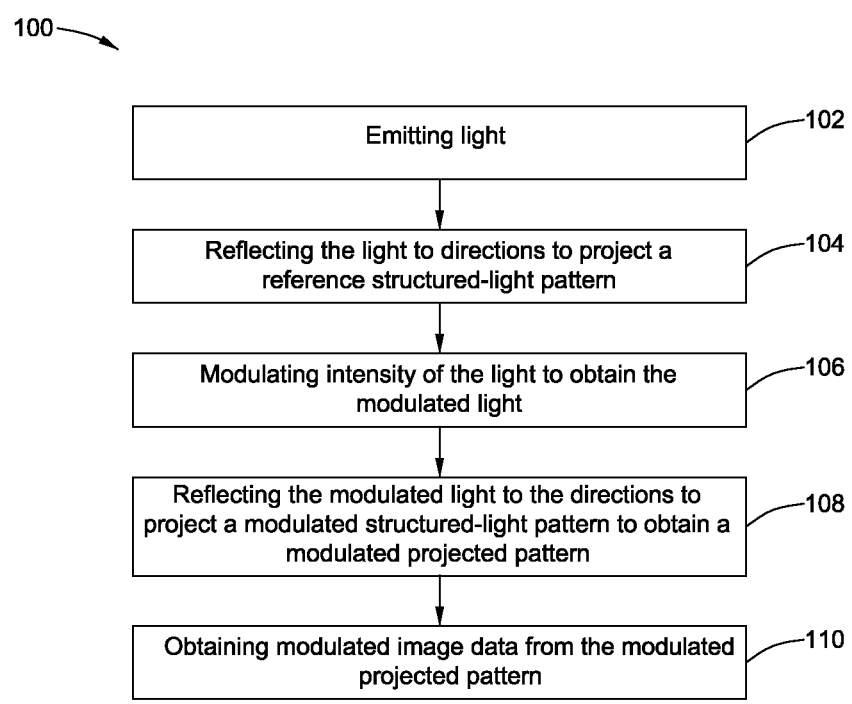
FIG. 4 is a flow chart of an inspection method in accordance with an embodiment.

FIG. 4 illustrates a flow chart of an inspection method 100 in accordance with an embodiment. In an embodiment, the inspection method 100 may be for 3D imaging and measurement of an object surface. In step 102, light is emitted. In step 104, the light is reflected to multiple directions to project at least one reference structured-light pattern onto the object surface 74 to obtain at least one reference projected pattern. In step 106, intensity of the light is modulated according to the at least one reference projected pattern to obtain the modulated light. In step 108, the modulated light is reflected to the multiple directions to project at least one modulated structured-light pattern onto the object surface 74 to obtain at least one modulated projected pattern. In an embodiment, in step 110, modulated image data are obtained from the at least one modulated projected pattern. The modulated image data can be utilized to reconstruct an image of the object surface, and the 3D dimensional information of the object can be obtained from the image.

The order of the steps and the separation of the actions in the steps shown in FIG. 4 are not intended to be limiting. For example, the steps may be performed in a different order and an action associated with one step may be combined with one or more other steps or may be sub-divided into a number of steps. One or more additional actions may be included before, between and/or after the method 100 in some embodiments.

While embodiments of the invention have been described herein, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

Furthermore, the skilled artisan will recognize the interchangeability of various features from different embodiments. The various features described, as well as other known equivalents for each feature, can be mixed and matched by one of ordinary skill in this art to construct additional systems and techniques in accordance with principles of this disclosure.

The invention claimed is:

1. A probe system, comprising:
  a light source configured to emit a light point or a light line at a first intensity;
  at least one mirror configured to tilt so as to reflect the light point or light line and form a projected light line or light area;
  a diverging lens interposed between the light source and the at least one mirror, wherein the diverging lens is configured to receive the light point or light line from the light source and direct the light point or light line to the at least one mirror;
  a grating positioned downstream from the at least one mirror so as to receive the projected light line or light area and to shadow the projected light line or light area to form at least one reference structured-light pattern;
  a light sensor configured to sense light intensity of a projected pattern of light resulting from reflection of the at least one reference structured-light pattern from an object surface and to output image data in response to the sensed light intensity;
  a microcontroller configured to:
    receive the image data including the sensed light intensity of the projected pattern of light from the light sensor; and
    determine the sensed light intensity of the projected pattern of light; and
    output, when the sensed light intensity of the projected pattern of light is determined to be greater than an upper intensity value threshold or less than a lower intensity value threshold, one or more commands operative to adjust an intensity of the light point or light line from the first intensity to a second intensity such that the sensed light intensity of the projected pattern of light is adjusted to be between the upper intensity value threshold and the lower intensity value threshold.

2. The probe system of claim 1, wherein the light source comprises one or more point light sources configured to emit one or more light points.

3. The probe system of claim 1, wherein the light source comprises a line light source configured to emit a light line.

4. The probe system of claim 1, further comprising an array of optical fibers configured to receive light emitted by the light source and generate a light line.

5. The probe system of claim 1, wherein the at least one mirror is configured to tilt in two directions.

6. The probe system of claim 1, wherein the at least one mirror is configured to tilt in one direction.

7. The probe system of claim 1, wherein the at least one mirror comprises one or more micro electro mechanical systems mirror scanners.

8. A method, comprising:
emitting a light point or light line at a first intensity from a light source;
transmitting the light point or light line to a diverging lens;
reflecting the light point or light line received from the diverging lens at a plurality of directions to form a projected light line or light area;
receiving, by a grating, the projected light line or light area;
shadowing, by the grating, the projected light line or light area to form at least one reference structured-light pattern;
measuring light intensity of a projected pattern of light resulting from reflection of the at least one reference structured-light pattern from an object surface;
determining that the measured light intensity of the projected pattern is greater than an upper intensity value threshold or less than a lower intensity value threshold; and
modulating intensity of the light point or light line from the first intensity to a second intensity; and
reflecting the modulated light to the plurality of directions to form at least one modulated projected light line or light area; and
shadowing, by the grating, the modulated projected light line or light area to form at least one modulated structured-light pattern;
wherein the measured light intensity value of at least one modulated projected pattern resulting from reflection of the at least one modulated structured-light pattern onto the object surface is between the upper intensity value threshold and the lower intensity value threshold.

9. The method of claim 8, wherein emitting light comprises emitting one or more light points.

10. The method of claim 8, wherein emitting light comprises emitting a light line.

11. The method of claim 8, wherein projecting at least one reference structured-light pattern comprises controlling one or more controllable mirrors to tilt in one-dimensional direction.

12. The method of claim 8, wherein projecting at least one reference structured-light pattern comprises controlling one or more controllable mirrors to tilt in two-dimensional direction.

13. The probe system of claim 1, wherein the microcontroller is further configured to output one or more commands operative to maintain the intensity of light emitted by the light source when the measured light intensity value of the predetermined region is between the upper intensity value threshold and the lower intensity value threshold.

* * * * *